United States Patent [19]

Lannuzel et al.

[11] Patent Number: 4,583,409
[45] Date of Patent: Apr. 22, 1986

[54] METHOD FOR MEASURING THE FLOW PARAMETERS OF A FLUID AND DEVICE UTILIZING THE METHOD

[75] Inventors: Olivier Lannuzel, Meaux; Thierry Pradal, Creteil, both of France

[73] Assignee: CGR Ultrasonic, France

[21] Appl. No.: 642,282

[22] Filed: Aug. 20, 1984

[30] Foreign Application Priority Data

Aug. 24, 1983 [FR] France ............................. 83 13658
Dec. 16, 1983 [FR] France ............................. 83 20198

[51] Int. Cl.⁴ ............................................. G01F 1/74
[52] U.S. Cl. .................................. 73/861.25; 128/663
[58] Field of Search ...................... 128/663; 73/861.25

[56] References Cited

U.S. PATENT DOCUMENTS 4,265,126 5/1981 Papadofrangakis et al. .
4,320,765 3/1982 Cathignol et al. .................. 128/663
4,324,258 4/1982 Huebscher et al. .
4,484,478 11/1984 Haibonen ...................... 73/861.25 X

FOREIGN PATENT DOCUMENTS 092841 11/1983 European Pat. Off. .

OTHER PUBLICATIONS

Greene et al., "Noninvasive Pulsed Doppler Blood Velocity Measurement and Calculated Flow in Human Digital Arteries," ISA Transactions, vol. 20, No. 2, 1981, pp. 15–24.
Winter et al., "Ultrasonic Detection of Cardiovascular Flow Disturbances," ISA Transactions, vol. 15, No. 3, 1976, pp. 237–241.
Marganitz, "Mikrowellen-Tachometer misst berührungslos Geschwindigkeitsmessung auch bei Schwebefahrzeugen," Elektronik, vol. 26, No. 4, 1977, pp. 97–98.

Primary Examiner—Kyle L. Howell
Assistant Examiner—Francis J. Jaworski
Attorney, Agent, or Firm—Pollock, VandeSande & Priddy

[57] ABSTRACT

The invention relates to a method of measuring the flow parameters of a fluid, and to a device utilizing this method, in which the autocorrelation function of the signal transmitted back by a particle of the fluid in motion is calculated. The mean speed and the variance of the flow are calculated by calculating the derivations of orders 1 and 2 of this autocorrelation function.

12 Claims, 6 Drawing Figures

FIG_1
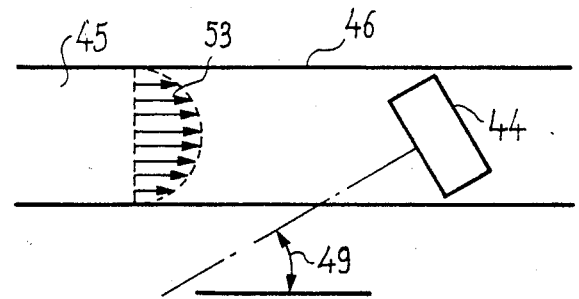
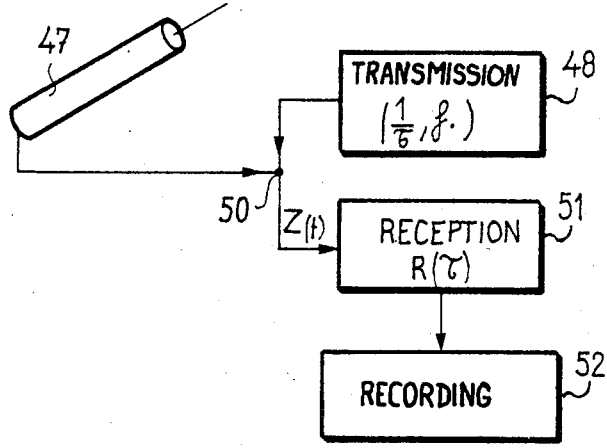
FIG_4
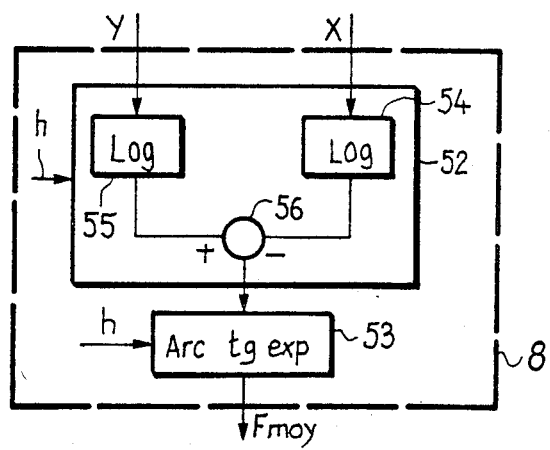

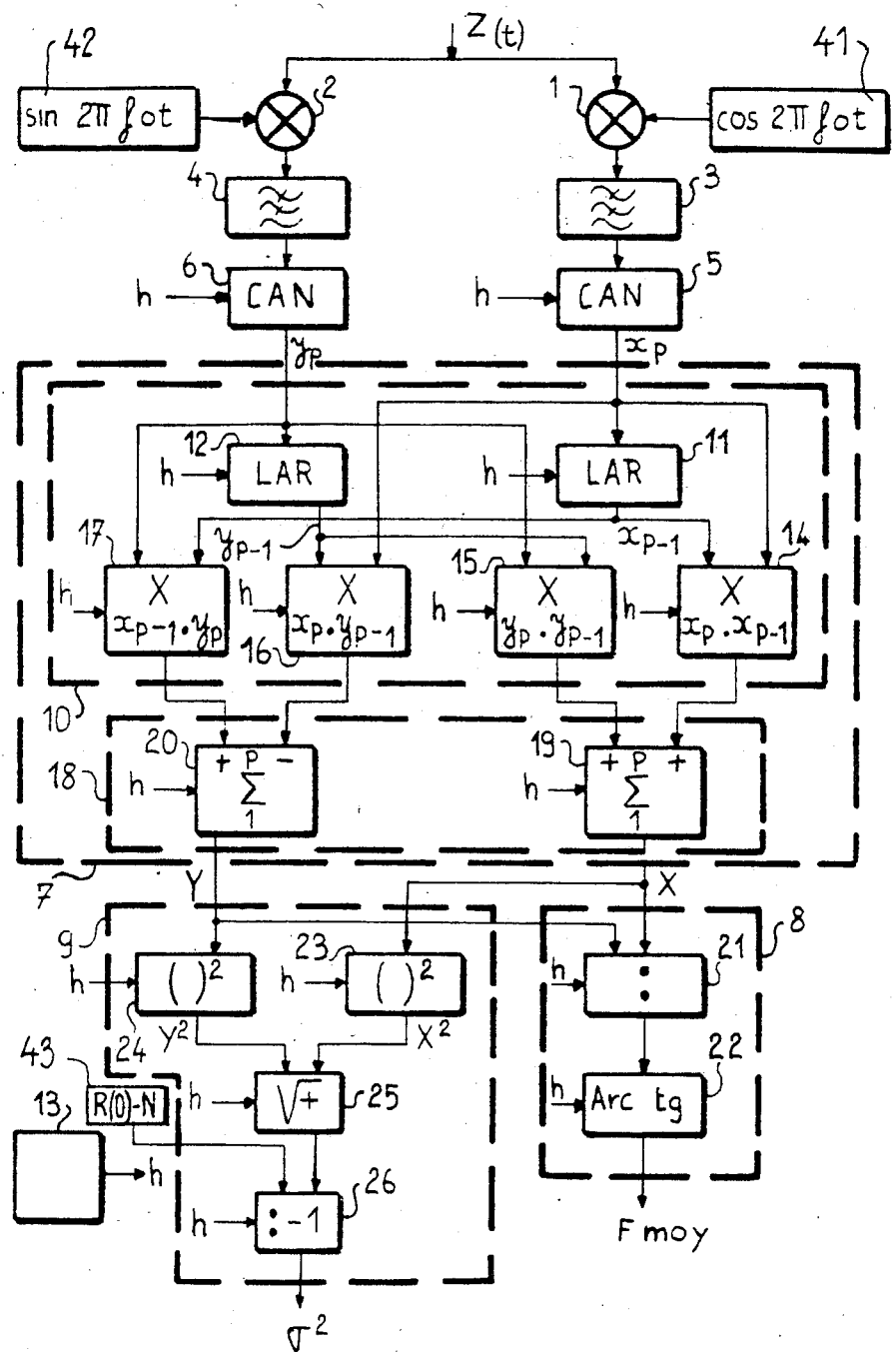

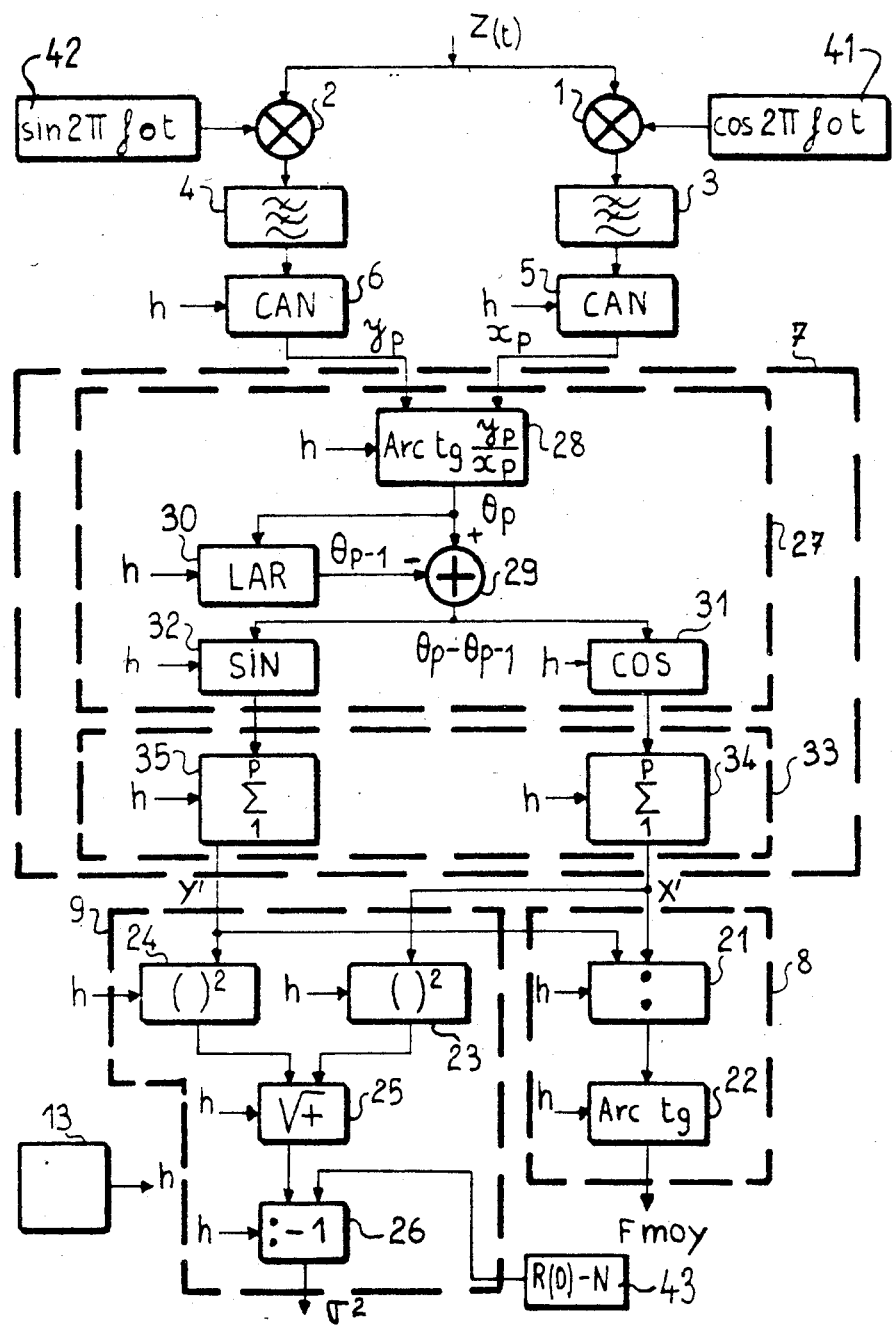
Fig_3

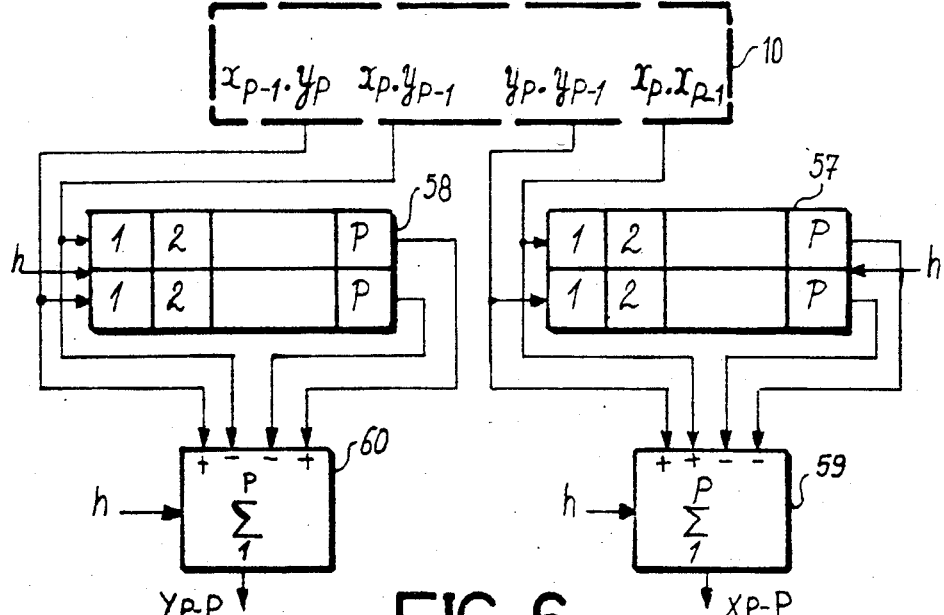
FIG_5
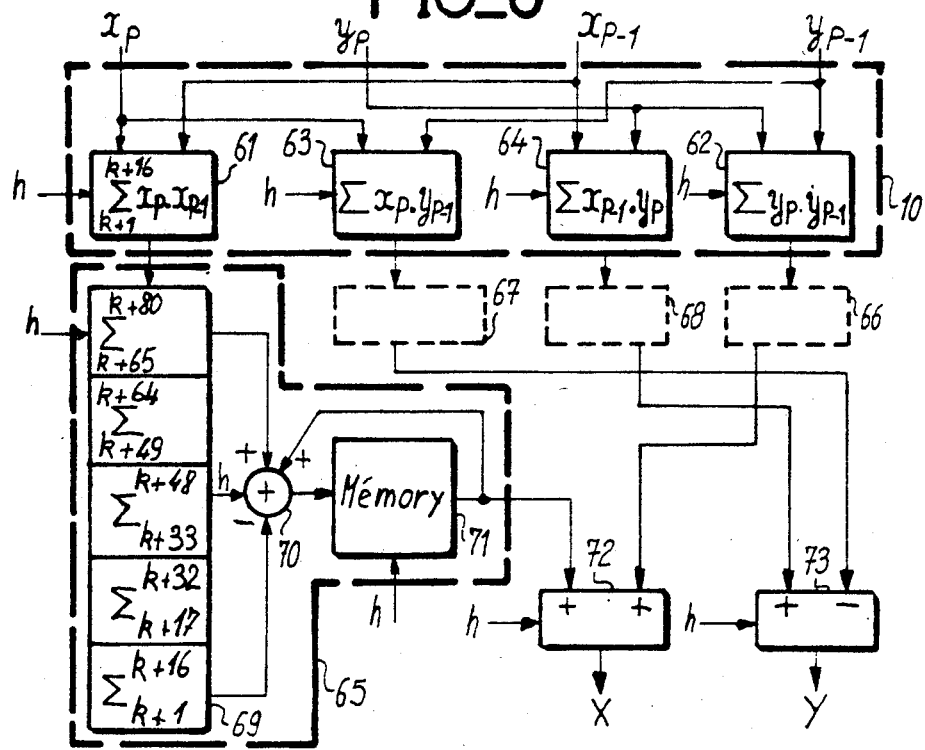
FIG_6

METHOD FOR MEASURING THE FLOW PARAMETERS OF A FLUID AND DEVICE UTILIZING THE METHOD

BACKGROUND OF THE INVENTION

1. Field of the Invention

The invention relates to a method for measuring the flow parameters of a fluid and to a device utilizing this method. This method and this device are utilized more particularly in the medical field, the fluid in question then being the blood of a patient, and the flow parameters which are of interest are the mean speed of flow of the blood and the distribution of the speeds of the particles of this blood in a particular section of a vein or artery. Its most useful application is ultrasonic echography.

The measurement of the mean speed of a fluid in a tube is of interest since it renders it possible to determine the rate of fluid flow, if the cross-section of the tube in question is known. The distribution of the speeds of the fluid particles in the section of the tube renders it possible to assess the presence or absence of turbulence phenomena in the flow. It will thus be grasped intuitively that a flow undergoing but little disturbance will have a mean speed of flow substantially equal to the speed at all points of a cross-section, whereas a highly disturbed flow displays a great spread in its speed diagram. In a turbulent flow, fluid particles may even be present which are displaced in the opposite direction of that of the mean speed of flow in view of the presence of vortices.

It is known that the speed of flow of an elementary volume or "cell" of a fluid may be measured by transmitting a pulsed acoustic signal oscillating at an acoustic frequency in the direction of this cell by means of a probe. The signal transmitted is propagated as far as the cell, is reflected from the same and disseminated rearwardly in all directions and in particular towards the probe. Once the period of propagation in both directions between the probe and a cell under examination is known however, it is possible to open a time slot for receiving the reflected signal and none other. In practice, the probes utilized are reversible probes of a piezoelectric type, able to perform a periodic transmission at a given recurrence frequency of the pulsed sound signal and arranged for reception of the reflected signal, outside the transmission periods. In view of its reflection on a cell in motion, and by Doppler effect, the signal transmitted back oscillates at a sound frequency differing from the transmission frequency. The shift Δf between these two frequencies, established by Doppler effect, may be written as:

$$\Delta f = 2\frac{v}{c} \cdot \cos\beta \cdot fo.$$

In this expression, v and c respectively represent the speed of a particle of the cell reflecting the sound and the speed of sound in the intermediate medium. The value $\beta$ is the angle subtended between the direction of flow within the tube and the axis of the ultrasonic beam. The value fo is the frequency of the ultrasonic pulse transmitted.

On technological as well as experimental grounds, the useful sizes of the cells cannot be reduced as much as might be wished. In the greater proportion of cases, each of the dimensions of these cells, be it in width, length or depth, is wholly comparable to the dimensions of the flow tube cross-section. As a result, the signal transmitted back does not oscillate at a single sound frequency displaced by Doppler shift from the acoustic transmission frequency, but is a complex signal of which the spectrum distribution extends over a significant band. For example, for a group of particles of a cell flowing at speeds comprised between zero meters/second and four meters/second, the Doppler shift corresponding to each of these particles will be comprised between zero and 25 kilohertz if the acoustic transmission frequency is of the order of 4 megahertz and if the speed of propagation of the acoustic pulse in the interposed medium is of the order of 1500 meters/sec.

In view of the close correspondence between a speed of flow and a Doppler shift, a theory has been formulated for mensuration of the flow parameters of a fluid by measuring the spectral density of the signal transmitted back. If Z(t) denotes the signal transmitted back, the spectral density Z(f) is the modulus taken to the square of the Fourier transformation of the signal Z(t); this may be set down in the following form:

$$Z(f) = |\int Z(t) \cdot e^{-2\pi ft} \cdot dt|^2$$

Until the present invention, it was known that the means speed of flow of the fluid may be measured by calculation of the whole spectrum Z(f) to allow calculation of the mean frequency from the same, and to assess the more or less turbulent nature of the flow on the basis of the typical deviation or variance of this spectrum Z(f). The function Z(f) referred to in the continuation of this specification is not actually the spectrum of the signal transmitted back, but the spectrum of the signal transmitted back which had been exposed to an acoustic frequency demodulation and to a low-pass filtering operation so that it then represents none but the spectrum of the Doppler shift as such. It may be demonstrated that these considerations have no bearing on the validity of the preceding expression Z(f).

2. Description of the Prior Art

Based on this theory, those versed in the art seek to calculate as precisely as possible the amplitude of each of the lines of the spectrum of Z(f). To this end, they utilize equipment performing a fast Fourier transformation (referred to as FFT). As a matter of fact, this FFT equipment performs a discrete Fourier transformation of the signal. This means that for each pulse of the signal transmitted back, the signal received is demodulated by means of two oscillators in phase quadrature, each of the two signals thus demodulated is filtered by means of a low-pass filter, and quantified samples are taken by means of blocking samplers followed by analog-digital converters at the end of an always constant period following the onset of the pulse transmission. The FFT equipment thus collects a plurality of successive samples corresponding to a plurality of pulses of the signal received. After a period of calculation, they provide a set of numeric values representing the amplitudes of each of the lines of spectrum.

This FFT equipment has a first disadvantage which is related to its calculation circuits. As a matter of fact, this may operate on a number of samples only, which is a power of 2: for example 64 or 128 samples. Much as it may be appreciated that the accuracy of the results given by this method increases with the number of samples, it is no less understandable that this method implies assumptions regarding the constancy of the flow action under investigation. If the flow is not constant, it is appropriate to consider the same steady flow for a limited period only, implying a limitation of the number of samples to be taken into account for a given measurement precision. If, allowing for constancy, the optimum sample number is of the order of 90, it is observed that mensuration by means of FFT equipment has disadvantages since 90 is not a power of 2.

If the moments of order n of the Fourier transformation are denoted by $m_n$, it is possible to state:

$$m_n = \int f^n \cdot Z(f) \cdot df$$

The result is that $m_o$ is equal to the energy of the signal returned, $m_1$ corresponds to the mean frequency, and that the variance $\sigma$ sought has the form:

$$\sigma^2 = m_2 - m_1^2$$

On the basis of standardization, it is acceptable to represent the means speed by $m_1/m_o$ and the variance by:

$$\sigma^2 = \frac{m_2}{m_o} - \frac{m_1^2}{m_o}$$

Notwithstanding the fact that each of these terms $m_o$, $m_1$ and $m_2$ must be calculated, which is onerous, the method yields results of which the accuracy largely depends on the signal/noise ratio of the signal returned. In practice, the signal/noise ratio of the signal returned should be at least 20 dB. Now, the walls of the flow tube give rise to the appearance of fixed echoes, situated around zero hertz in Doppler shift since the walls vibrate a little under the action of the flow. These fixed echoes are commonly much more powerful than the useful signal: their amplitude exceeds that of the latter by a magnitude of the order of 30 dB. The elimination of the fixed echoes consequently requires the presence of echo-rejector filters of costly construction since the flanks of these filters should be very rigid to enable them to reject the echoes at approximately 30 dB below the value of the useful signal. Their rejection ratio should actually exceed or be equal to 20 dB + 30 dB = 50 dB.

Furthermore, it is necessary to make allowance for the noises of quantification, apart from mensuration noises. As a matter of fact, because of allowing for a value close to the demodulated quantities, these introduce an additional error into the calculation results. If N is the spectral noise density within the band of the useful signal, it is necessary to replace Z(f) by Z(f)−N;

N can be calculated easily by measuring its value in the absence of a returned signal. It is very onerous on the contrary to introduce N into the calculation of each of the moments of the Fourier transformation of Z(t).

Another method which does not make use of FFT equipment yields a diagram of the spectrum of the useful return signal by counting, for each of the pulses, the passages through zero of the filtered demodulated return signal. For a counting period known beforehand, the number of passages through zero of the filtered demodulated signal is directly proportional to the mean frequency of this signal during the pulse in question. It is appropriate however to observe that the result given by this method for the mean frequency is not a precise result in the first place and is highly affected by noise in the second place. The result is not precise since it may be shown that it is proportional to:

$$\frac{\sqrt{\int f^2 \cdot Z(f) \cdot df}}{\int f \cdot df}$$

which is not strictly equal to $m_1/m_o$ which is the true value. The method for counting the passages through zero is impervious to noise moreover since, to prevent accidental counting actions in the presence of noise, the counters incorporate a pair of lower and upper thresholds and a counting action is caused only if these two different thresholds are traversed successively by the signal. As a result, the measurement of the mean frequency is always obtained in a deficient manner, since no allowance is made for the oscillations of the filtered demodulated return signal of which the amplitudes are comprised between these two thresholds. On the other hand, the more the signal is affected by noise, the more it is appropriate to raise the thresholds and the greater the inaccuracy of the result.

SUMMARY OF THE INVENTION

The invention has as its object to overcome the disadvantages specified, while formulating the problem in a different manner. As a matter of fact, the user has no interest in the whole spectrum of the Doppler signal, but solely in its mean speed and in its variance. Consequently, rather than calculate the amplitudes of each of the lines of the spectrum and thereupon performing calculations on this amplitude distribution of moments allowing evaluation of the mean frequency and of the variance, it proposes a method which although less exhaustive regarding knowledge of the problem, provides a direct and exclusive calculation of the results of interest to the user. The invention has as its starting point the premise that there is a close relationship between the spectral density Z(f) of a signal Z(t) and the autocorrelation function R($\tau$) of this signal Z(t), and that the moments of the order n,$m_n$ of Z(f) are equal to the derivation of the order n of the autocorrelation function calculated for $\tau = 0$. This may be set down in the form of a general expression:

$$\frac{1}{(j2\pi)^n} \cdot \frac{d^n R(\tau)}{d\tau^n}\bigg|_{\tau=0} = m_n = \int f^n \cdot Z(f) \cdot df$$

The invention relates to a method for measuring the flow parameters of a fluid, in which a pulsed acoustic signal oscillating at an acoustic frequency is transmitted periodically at a recurrence freqency;

the acoustic signal is received upon being transmitted back by a cell of the fluid to be investigated;

the signal received is demodulated in phase quadrature by means of two oscillators oscillating at the frequency of the acoustic signal;

each of the two demodulated signals is filtered, and both are quantified for extraction, from these two electrical quantities corresponding to the real and imaginary parts of a complex sampled signal representing the signal received; which is characterized in that:

the discrete autocorrelation function of this complex signal is calculated for a number of samples of the complex signal sampled;

and in that the derivations of the order n of this autocorrelation function are calculated to obtain the flow parameters of the fluid which correspond to each of these orders.

The invention equally relates to a device for measuring flow parameters of a fluid, comprising means for periodic transmission at a recurrence frequency of a pulsed acoustic signal oscillating at an acoustic frequency, means for receiving this acoustic signal upon being transmitted back by a cell of the fluid which is to be investigated, means for performing a demodulation in phase quadrature of the signal received, comprising two oscillators tuned to the frequency of the acoustic signal, and means for filtering and quantifying each of the two signals demodulated and thereby producing a complex sampled signal representing the signal received, characterized in that it comprises delay means for calculating the product of a complex sampled signal corresponding to a sample times the same signal corresponding to an immediately preceding sample, summating means for summating the signals supplied by the delay means and for calculation in this manner of the real and imaginary parts of a complex signal representing the discrete autocorrelation function of the complex signal sampled, and means for calculating the derivations of the order n of this autocorrelation function corresponding to the flow parameters of the fluid.

BRIEF SUMMARY OF THE DRAWINGS

A better understanding of the invention will be gained from the following description and the figures accompanying the same. These are not restrictive regarding either the method or the device according to the invention.

FIG. 1 illustrates the diagram of a measuring apparatus in accordance with the invention, FIG. 2 illustrates an apparatus utilizing the method of the invention, FIG. 3 illustrates an apparatus utilizing a simplified method of the invention, FIGS. 4 to 6 illustrate modified forms of the apparatus of the invention.

DESCRIPTION OF THE INVENTION

FIG. 1 illustrates the general layout of an apparatus for measuring the flow parameters of a fluid in accordance with the invention. A cell 44 of the fluid 45 circulating in a tube 46 is exposed to an acoustic excitation transmitted by a probe 47. This acoustic excitation is generated in pulsed form by a transmitter 48. The transmitter 48 supplies pulses at the repetition rate $1/\tau$. The acoustic signal present in these pulses oscillates at a frequency $f_o$. The duration of each pulse amounts to a few cycles of the frequency fo. The directional setting of the probe 47, and consequently the main direction of propagation of the oscillations transmitted, subtends an angle 49 with the line perpendicular to the tube section at the location of the cell. In practice, the angle 49 amounts to between 45° and 60°. By means of a duplexer 50 or of any other means of performing the same tasks, the probe 47 of a reversible kind picks up the signal Z(t) transmitted back by the cell and injects the same into a receiver 51. The receiver 51 is in accordance with the invention and, in particular, calculates the autocorrelation function $R(\tau)$ of the signal Z(t). The receiver 51 supplies the measurement results for the flow parameters sought. These may be exploited in an optional manner and may in particular be recorded in a recorder 52.

These parameters correspond to the diagram 53 of the speeds of the fluid 45.

Knowing a signal Z(t), the autocorrelation function $R(\tau)$ of this signal Z(t) may be written as:

$$R(\tau) = \int Z(t) \cdot Z^*(t-\tau) \cdot dt = A(\tau) \cdot e^{j\phi}(\tau)$$

since $R(\tau)$ is a complex signal in this case. If Z(t) is a sampled signal, a discrete autocorrelation function may be defined by means of the following formula:

$$r(\tau) = \Sigma_P z_P \cdot z^*_{P-1} = X + jY$$

In this formula, P is the total number of samples taken into account to calculate $r(\tau)$, and p the time index of a sample, p−1 being the sample which had appeared immediately before the sample p. Furthermore, $z_P$ may be written as:

$$z_P = x_P + jy_P,$$

in which expression j is the complex number such that $j^2 = -1$ and in which $x_P$ and $y_P$ are the amplitudes of the signal Z(t) once it has been demodulated by two oscillators in quadrature and then filtered and quantified. The signal z is referred to as the complex sampled signal.

In FIG. 2, as in FIG. 3, the signal Z(t) is fed in at the same time at a first input of two demodulators 1 and 2 which at their second inputs receive respectively signals in quadrature cos $(2\pi f_o t)$ and sin $(2\pi f_o t)$, supplied by two oscillators 41 and 42 in quadrature. These two demodulators perform a transposition of the Doppler spectrum by a quantity equal to $f_o$. They perform a demodulation, described as in quadrature, since the signals acting on them via their second inputs are in phase quadrature with respect to each other. A complex sampled signal of which the real part $x_P$ is supplied by the sampler 5 and of which the imaginary part $y_P$ is supplied by the sampler 6, is obtained by passing each of the demodulated signals through a low-pass filter 3 and 4 respectively and by sampling them in samplers 5 and 6 respectively of which each comprises a sampler-blocker followed by an analog/digital converter (CAN). The devices of FIGS. 2 and 3 also comprise circuits 7 for calculation of the autocorrelation function of the signal Z(t) and circuits 8 and 9 for calculating the derivations of the orders 1 and 2 of this autocorrelation function. Since the signal sampled is complex, the discrete autocorrelation function $r(\tau)$ is complex, and its real part is X, its imaginary part being Y.

It is apparent from the method according to the invention that the disadvantages referred to above are eliminated. In particular, the incidence of noise disappears since it is one of the properties of an autocorrelation function of a signal that it is free of noise. As a matter of fact, the noise not being autocorrelated, its autocorrelation function differs from zero only if $\tau$ is nil; for any other value of $\tau$, the irregular variations of the noise signal have the result that the autocorrelation function of this noise is zero. It is for this reason that the calculation of the moments of the order n given by the general expression of the moments apparent from the foregoing will be performed, with a particular limitation, not at $\tau=0$ but at $\tau$ equal to the recurrence period of the mensuration pulses. It will be demonstrated that this approximation is justified. Furthermore, by contrast to the zero traversal counting method, it will become apparent from the following that the results provided by the method of the invention are precise. Furthermore, for the purpose of improving accuracy, it is possible to take a number of samples which is an optimum with respect to the steady conditions of the phenomenon investigated and to the accuracy it is wished to secure. This is impossible with the FFT method. Finally, although the mathematical concepts which must be handled to calculate the mean frequency and the variance are difficult, the items of equipment to be utilized, which derive from these calculations, are simple and imply a significant reduction of the multiplication operations required to reach the result. As a matter of fact, in the method of the invention, as in that of the prior art making use of FFT equipment, the processing of the signals occurs in digital form, and it may be demonstrated that for a number P of samples taken in each of the methods, the number of multiplying operations required in the method of the invention is smaller in a ratio of $Log_2 P$ than that needed in the FFT method ($Log_2 P$ denotes the logarithm of P to the base 2).

In order to calculate the moment of order 1 of the Fourier transformation Z(f) corresponding to the mean speed of flow of the fluid and thus to the mean frequency of the Doppler spectrum, it may be written under application of the general expression for the moments:

$$m_1 = \int f \cdot Z(f) \cdot df = \frac{1}{j2\pi} \cdot \frac{dR(\tau)}{d\tau} \simeq \frac{R(\tau) - R(0)}{j2\pi\tau}$$

to $\tau = 0$

The approximation of the first derivation of $R(\tau)$ as represented at the end of this expression is correct since it is based on a property of the autocorrelation function, meaning that $R(-\tau)$ equals $R(\tau)$ conjugated. In this case $\tau$ is the sampling period and consequently corresponds to the reciprocal of the recurrence frequency. $R(\tau)$ may however be written as:

$$R(\tau) = A(\tau) e^{j\phi(\tau)}$$

in which expression $A(\tau)$ is a real symmetrical function and in which $\phi(\tau)$ is a real antisymmetrical function. As a result thereof, it is possible to write:

$$\frac{dA(\tau)}{d\tau} = 0 \text{ to } \tau = 0$$

which leads to any calculation performed:

$$m_1 = \frac{A(\tau)}{2\pi} \cdot \frac{d\phi(\tau)}{d\tau} \cdot e^{j\phi(\tau)}$$

to $\tau = 0$

One may express:

$$\frac{d\phi(\tau)}{d\tau} \text{ in the form } \frac{d\phi(\tau)}{d\tau} \simeq \frac{\phi(\tau) - \phi(0)}{\tau} = \frac{\phi(\tau)}{\tau}$$

to $\tau = 0$   to $\tau = \tau$ since $\phi(0)$ is zero, knowing that $\phi(\tau)$ is a real antisymmetrical function.

For the same reason, we have:

$$m_o = R(0) = A(0)e^0 = A(0).$$

Observing that $\phi(\tau)$ is the argument of $R(\tau)$, it is then possible to write:

$$m_1 = \frac{m_o}{2\pi\tau} \cdot \text{Arg}(R(\tau)) \simeq \frac{m_o}{2\pi\tau} \cdot \text{Arg}(r(\tau))$$

This expression may also be written by expressing $r(\tau)$ in its form dependent on the samples $(x_P, y_P)$. A final expression is then obtained for the moment of order 1 of Z(f):

$$m_1 \simeq \frac{m_o}{2\pi\tau} \cdot \text{Arc tg} \frac{\sum_{P}^{P}(y_P \cdot x_{P-1} - y_{P-1} \cdot x_P)}{\sum_{P}(x_P \cdot x_{P-1} + y_P \cdot y_{P-1})} \simeq \frac{m_o}{2\pi\tau} \cdot \text{Arc tg} \frac{Y}{X}$$

It is apparent as a result that for the calculation of $m_1/m_o$ which is of interest to us, it is then sufficient to calculate the real and imaginary parts X and Y of the discrete autocorrelation function $r(\tau)$.

The circuit 7 of FIG. 2 comprises delay means 10, such that at each pulse received, it is possible to ascertain the quantities $x_P$ and $y_P$ of the complex sampled signal corresponding to the sample of the order p and to ascertain the same elements of the preceding sample, that is to say of the order $p-1$. To this end, the delay means have two delay lines 11 and 12(LAR), respectively, connected in cascade to the outputs of the samples 5 and 6. These delay lines 11 and 12 deliver at their outputs the information they receive at an instant t, only at the end of a period $t+\tau$, where $\tau$ corresponds to the aforesaid sampling period. In practice these delay lines may be formed by shift registers which at their inputs are supplied in parallel with the binary data of the quantified signal supplied by the samplers, and returning these data at their outputs in parallel under the action of a clock pulse h generated by a sequencer 13. This sequencer 13 is synchronized with the transmission of the acoustic pulses.

The delay means 10 also comprise a set of multipliers 14 to 17 which at their inputs receive the real parts x or imaginary parts y of the complex signal sampled, corresponding to a given sample and to a preceding sample, so that the following multiplications:

$$x_P x_{P-1}, y_P y_{P-1}, x_P y_{P-1}, x_{P-1} \cdot y_P.$$

may be performed respectively at the repetition rate established by the sequencer 13. The circuit 7 for calculation of the autocorrelation function comprises, in cascade with the delay means 10, summating means 18 comprising two summators-accumulators 19 and 20 connected, respectively via their inputs, to the outputs of the multipliers 14–15 and 16–17. For a number P of samples, these summators-accumulators perform the calculation of the real values X and imaginary values Y of the autocorrelation function $r(\tau)$. The number P of successive additions performed by each of the summators-accumulators 19 or 20 may be selected at will, that is to say without restriction to a proportionality of some kind to the numeral 2.

The means 8 for calculation of the derivation of order 1 of the autocorrelation function comprises a divider 21 performing the division of the imaginary part Y of the autocorrelation function by the real part X of this same function, in accordance with the application of the final expression of the moment of order 1. In series with the divider 21 is connected a tangent arc memory 22 which under addressing is supplied at its inputs with the value of the tangent of an angle to be found, and delivering the value of this angle as its output. In practice, all the calculations performed by the circuits numbered 10 to 12 may be performed by a microprocessor. In this case, the memory 22 is a preprogrammed ROM able to cope with trigonometric arc-tangent conversion.

The general expression of the moments of the order n of the Fourier transformation Z(f) of the signal Z(t) makes it possible to write:

$$\frac{d^2R(\tau)}{d\tau^2}\bigg|_{\tau=0} = -4\pi^2 \int f^2 \cdot Z(f) \cdot e^{j2\pi f\tau} df \bigg|_{\tau=0}$$

If $R(\tau)$ is replaced in the first side of this equation by its expression as a function of its module $A(\tau)$ and of its argument $\phi(\tau)$ while in particular having developed $A(\tau)$ in the form of a limited development and having normalized the variance in order to free the same from the energy of the signal Z(t), it is possible to state, once all the calculations are completed:

$$\sigma^2 = -\frac{1}{2\pi^2\tau^2} \cdot \left(\frac{A(\tau)}{A(0)} - 1\right) = -\frac{1}{2\pi^2\tau^2} \cdot \left(\frac{|R(\tau)|}{R(0)} - 1\right)$$

In this expression, $\tau$ is the sampling period equal to the reciprocal of the recurrence frequency and $A(\tau)$ is the module of $R(\tau)$ whereas $A(0)$ is equal to $R(0)$. Once this stage is reached, it is appropriate to observe that, if there is no noise, R(0) actually represents the module of the autocorrelation function of the signal for $\tau=0$, that is to say, its energy. Since the signal Z(t) is affected by noise, it is appropriate to substitute $R(0)-N$ for $R(0)$: N being the noise energy in the analysis window. In these circumstances, the final expression for the variance will be equivalent to:

$$\sigma^2 = -\frac{1}{2\pi^2\tau^2}\left(\frac{|R(\tau)|}{R(0)-N} - 1\right)$$

The means 9 for calculation of the moment of order 2 of the Fourier transformation Z(f) simply perform this last operation. Since the signal is a sampled signal, it is appropriate to replace $R(\tau)$ by $r(\tau)$. The real part X and the imaginary part Y of this latter function are available however, by reason of the means 7 for calculating the autocorrelation function apparent from the foregoing. The module of a complex signal of this kind being equal to the square root of the sum of the squares of the real and imaginary parts, each of the signals X or Y is fed to the two inputs of a multiplier which at its output supplies a quantity representing the square of the quantity supplied to its input. The multipliers 23 and 24 receive the signals X and Y at their inputs, respectively. A circuit 25 supplied at its inputs with the outputs of the multipliers 23 and 24, performs the operation corresponding to the square root of the sum of the signals fed in at its inputs. This being so, the output of the circuit 25 delivers a quantity equal to the module of $r(\tau)$.

A circuit 26 supplied at one of its inputs with the output of the circuit 25 and at another input with an electrical quantity proportional to $R(0)-N$, establishes the ratio between these two quantities and deducts the quantity 1 from the same. No difficulty arises in obtaining $(R(0)-N)$: R(0) is the mean energy of the signal received, meaning the useful signal in the presence of noise. This energy may be measured by any conventional means. N is the energy of the noise which is measured by means identical to those in the foregoing, but during an absence of the useful signal, that is to say without any acoustic transmission. The subtraction $(R(0)-N)$ no longer raises difficulties either. The totality of these means is denoted by 43. The circuit 26 thus delivers a signal representing the variance of the Doppler spectrum corresponding to the variance of the flow speed of the cell of the fluid investigated.

In a preferred embodiment, all the operations performed by the operators 23 to 26 under the action of the sequencer 13 are made by means of a microprocessor programmed for this purpose. This microprocessor may be the same as that which had been utilized to calculate the mean frequency. In particular, it is observed that the circuits 23 and 24 perform multiplications as do the multipliers 14 to 17, and that they consequently correspond to operations of an analogous type in the microprocessor which would be utilized. The method and the device which have been described consequently render it possible to resolve the problem posed in an efficient manner.

A noteworthy simplification of this method and device may be obtained by making a supplemental assumption regarding the variation of the module of the complex signal sampled, throughout the series of P samples taken into account. As a matter of fact, the expression $z_P$ of this signal may be written down in a new form:

$$z_P = x_P + jy_P = \rho_P e^{j\theta_P}$$

It is assumed that the module $\rho_P$ varies but little in the extension of the analysis window, meaning that it is equal to the module $\rho_{P-1}$ and that this applies for all the p samples taken into account for calculation of the parameters of interest. This results in a substantial simplification in the calculation of the variable of $r(\tau)$ which becomes:

$$\text{Arg}(r(\tau)) = \text{Arc tg} \frac{\sum\limits_{P}\sin(\theta_P - \theta_{P-1})}{\sum\limits_{P}\cos(\theta_P - \theta_{P-1})}$$

Also within the circuit 7 for calculation of the autocorrelation function of FIG. 3, the argument of the complex signal sampled is calculated for each sample in a delay circuit 27 by feeding the real and imaginary parts $x_P$ and $y_P$ of this sample to the address inputs of a register 28 performing the trigonometrical arc-tangent conversion of $y_P/x_P$. The argument $\theta_P$ is then fed into the "plus" input of an adder 29 whereas the argument $\theta_{P-1}$ is fed to the "minus" input of this adder 29. $\theta_{P-1}$ is obtained by causing $\theta_P$ to pass through a delay line 30 analogous to the delay lines 11 or 12. The signal supplied by the adder 29 is then transmitted at the same time to the address inputs of a cosine register 31 and of a sine register 32. The two registers 31 and 32 may, like the registers 22 and 28, comprise ROM's preprogrammed to fulfill these trigonometrical functions.

The delay circuit 27 is followed by a summator circuit 33 comprising two summators-accumulators 34 and 35 respectively, which are connected to the registers 31 and 32. The summators-accumulators 34 and 35 differ from the summators-accumulators 19 and 20 in that they comprise one input only. These summators-accumulators 34 and 35 deliver as their outputs, respectively, signals X' and Y' corresponding to the real and imaginary parts of the discrete autocorrelation function for which the assumption regarding the variation of the module of the complex signal sampled had been made. The remainder of the processing imposed on these signals X' and Y' is identical to that undergone by X and Y.

The last circuit 7 for calculation of the autocorrelation function comprising the delay circuit 27 and the summator circuit 33, may like the circuit 7 of FIG. 2 be replaced in a preferred embodiment by a microprocessor which performs the same calculations. As compared to that of FIG. 2, it offers the advantage that no further multiplying operation need be performed. The only operations performed are register reading operations and summation-accumulation operations. It equally offers the advantage that all the processing operations may be done in real time. Finally, it is observed that, in a form utilizing a microprocessor, the register 22 identical to the register 28 may be provided by itself, and that the multipliers 23 and 24 may moreover be replaced by a squaring register which at its output delivers a signal representing the square of the signal fed to its input.

In FIG. 4, the means 8 for calculating the derivation of order 1 of the autocorrelation function comprise a divider 52 performing the division of the imaginary part Y of the autocorrelation function by the real part X of this same function, in accordance with the application of the final expression of the moment of order 1. In series with the divider 52 is arranged an arc-tangent register 53 which under addressing is supplied at its inputs with the value of the tangent of an angle sought and delivers the value of this angle as its output. To simplify matters, the divider 52 may be a logarithmic divider, meaning that it comprises two logarithmic registers or tables, the quantities X and Y being supplied to the registers 54 and 55. At their outputs, these registers deliver the values Log X and Log Y, respectively. A subtractor 56, receiving the values produced by these registers, develops a result (Log Y−Log X) which is equivalent to Log Y/X.

With the invention as described, the fluid flow parameters may be calculated at each group of pulses P. There is no need to await the arrival of another group of P pulses to follow the course of these parameters in real time. As a matter of fact, a new incoming sample of the order P+1 may be recombined with the last P−1 samples received to perform another measurement. Thus, proceeding step by step, P samples are available in each case which, in real time, are always the last P samples received. To this end, in FIG. 5, the summators-accumulators 19 and 20 of FIG. 2 are replaced by a set of two shift registers 57 and 58, followed by two summators-accumulators 59 and 60. In this case, the shift registers contain 2P locations (P corresponds to the optimum number of samples). These registers receive the products established by the multipliers 14 and 15 on the one hand, and 16 and 17 on the other hand. At each pulse of the sequencer 13, a pair of real products ($y_P \cdot y_{P-1}$ and $x_P \cdot x_{P-1}$) and a pair of imaginary products ($x_{P-1} \cdot y_P$ and $x_P \cdot y_{P-1}$) respectively are fed into these shift registers, whereas a pair of real products and of imaginary products corresponding thereto but of earlier order (of order p−P; $y_{p-P} \cdot y_{p-1-P}$, $x_{p-P} \cdot x_{p-1-P}$, and $x_{p-1-P} \cdot y_{p-P}$, $x_{p-P} \cdot y_{p-1-P}$) are extracted from these registers. The summators-accumulators then add the products fed in at the same time as they subtract the products extracted. In this case, the demodulation and the quantification are permanent and the results are known in step with the arrival of the samples.

In FIG. 6, the multipliers 14 to 17 are replaced by multipliers-accumulators 61 to 64 which simultaneously receive the sample $z_P$ and the sample $z_{P-1}$ delayed by delay lines. These multipliers-accumulators 61 to 64 provide a result which corresponds to the accumulation of a particular number of multiplications. Each of them performs the multiplication of the operands fed into its inputs on the one hand, and on the other hand the accumulation of the results of its multiplications. In one example, they are integrated circuits TDC 1008, 1009 or 1010 of the TRW company (U.S.A.). Starting from a sample of given order k in the example, each of the multipliers-accumulators 61 to 64 of the circuit 10 delivers an accumulation over a package of 16 samples, of real products $x_{p-1} \cdot x_p$ and $y_{p-1} \cdot y_p$ and imaginary products $x_p \cdot y_{p-1}$ and $x_{p-1} \cdot y_p$. Each of these accumulations of real or imaginary products is fed, at the end of the processing of each package, into a shifting adding circuit 65 to 68 respectively. The circuits 65 to 68 are identical. The circuit 65 which is the only one shown, comprises a 5-section (64/16+1) shift register 69 driven by the sequencer 13, an adder 70 comprising three inputs and a memory 71. Each section of the register 69 contains the result of the accumulation of one of the last five successive packages of samples. The adder 70 and the memory 71 form an accumulator of conventional nature. But since this accumulator of conventional type works with the register 69, at the end of the processing of each package of samples, its contents relate to the last P(64) samples known: in this case P=64 since the register 69 has 5 sections. As a matter of fact, this accumulator of conventional type recurrently adds the accumulations supplied by the multiplier-accumulator 61 in step with their arrivals. Furthermore, it deducts the accumulation relating to the package of which the order is five before the order of the last package to arrive. Consequently, it always contains the sum of the accumulations of the last four packages received. Two summators 72 and 73 connected, respectively, to the circuits 65 and 66 and to the circuits 67 and 68, deliver the real and imaginary parts X and Y of the discrete autocorrelation function.

In the final analysis, all the actions occur in this case as in the circuit of FIG. 2. However, instead of taking an optimum number P of samples, reduced packages are taken: in this case being sub-multiples of P. These packages are recombined by means of shift registers 57 and 58 in FIG. 3 or by means of shift adders 65 to 68 in FIG. 6, to obtain a measurement depending on the optimum number P of the last samples known. The measurements overlap partially. The overlap difference corresponds to a package of samples.

We claim:

1. A method of measuring the flow parameters of a fluid, comprising the steps of:
   (a) transmitting periodically at a recurrent frequency a pulsed signal oscillating at an acoustic frequency to a cell;
   (b) receiving from the cell the pulsed acoustic signal reflected thereby;
   (c) demodulating the received signal in phase quadrature by two oscillators for producing two demodulated signals;
   (d) filtering and quantifying each of the two demodulated signals for producing a complex sampled signal, the complex sampled signal including a real part and an imaginary part;

(e) using a number of samples of the complex sampled signal for calculating a discrete autocorrelation function of the complex sampled signal; and (f) calculating the derivations of order n of the autocorrelation function for obtaining the flow parameters of the fluid, n being a positive integer.

2. A method according to claim 1, wherein step (e) further comprises:

using an optimum number of samples for calculating the autocorrelation function.

3. A method according to claim 2, further comprising:

assuming the flow of the fluid as being stationary for calculating the optimum number of samples and the flow parameters of the fluid.

4. A method according to claim 1, wherein step (e) further comprises:

calculating separately the real part and the imaginary part of the discrete autocorrelation function for determining the mean speed and the variance parameter, respectively, of the flow parameters.

5. A method according to claim 4, wherein the calculating separately step further comprises:

calculating partially the real parts and the imaginary parts of the autocorrelation function corresponding to the samples; and recombining the results of the partial calculations for obtaining the optimum number of samples for the autocorrelation function.

6. A method according to claim 1, further comprising the steps of:

calculating the argument of the complex sampled signal; and using the argument for calculating the mean flow speed parameter and/or the variance parameter of the fluid.

7. An apparatus for measuring flow parameters of a fluid, comprising:

transmitting means for periodically transmitting at a recurrence frequency a pulsed signal oscillating at an acoustic frequency to a cell of the fluid;

receiving means for receiving the pulsed acoustic signal reflected by the cell;

demodulation means having two oscillators tuned to the frequency of the acoustic signal for demodulating in phase quadrature the received acoustic signal, thereby producing two demodulated signals;

filtering and quantifying means for filtering and quantifying each of the two demodulated signals to produce a complex sampled signal representative of the received acoustic signal;

delay means for calculating the product of the complex sampled signal, the product corresponding to a sample of the complex sampled signal multiplying an immediately preceding sample of the same complex sampled signal;

summation means for summing the outputs of the delay means and for calculating therefrom the real parts and the imaginary parts of the complex signal representing the discrete autocorrelation function of the complex sampled signal; and calculating means for deriving from the autocorrelation function derivations of order n corresponding to the fluid flow parameters, n being a positive integer.

8. Apparatus according to claim 7, wherein the calculating means, for deriving from the autocorrelation function a derivation of order 1, comprises:

dividing means for dividing the imaginary part of the autocorrelation function by its real part; and trigonometric conversion means connected to the dividing means for generating a signal representative of the argument of the autocorrelation function, the argument signal corresponding to the mean speed of the fluid flow parameters.

9. Apparatus according to claim 7, wherein the calculation means, for deriving from the autocorrelation function a derivation of order 2, comprises:

generating means for generating a signal representative of the module of the autocorrelation function, the module being equal to the square root of the sum of the squares of the real and imaginary parts of the complex signal;

measuring means connected to the generating means for measuring the power of the acoustic signal received in the presence of noise and for measuring the power of the noise exclusively; and algebraic means for generating from measurements of the module and both of the powers a signal representative of the variance of the flow speed of the cell.

10. Appparatus according to claim 7, wherein the delay means comprises:

two delay lines connected to the quantifying means of the filtering and quantifying means; and four multipliers, each having two inputs, for receiving at either one of their two inputs the real part or the imaginary part of a given sample of the complex sampled signal and for receiving at their other input the real part or imaginary part of a preceding sample of the same complex sampled signal, the multipliers thereby generating the different terms of the real and imaginary parts from the product of the two samples of the complex sampled signal.

11. Apparatus according to claim 7, wherein the delay means comprises:

trigonometrical conversion means for calculating the argument for each sample of the complex sampled signal;

a delay line connected to the trigonometrical conversion means and associated with a subtractor for calculating the argument of the product of the complex sampled signal, corresponding to a sample of the complex sampled signal multiplying a preceding sample of the sample complex sampled signal; and a set of inverse trigonometrical conversion means for calculating from the argument the real and imaginary parts of the product.

12. Apparatus according to claim 10 or claim 11, wherein the summation means further comprises:

delivery means for delivering signals representing, respectively, sums of the last real and imaginary parts corresponding to the product of the last sample and the preceding sample of the complex sampled signal.

* * * * *